W. KRAFVE.
CHASSIS CONSTRUCTION.
APPLICATION FILED JUNE 6, 1918.
1,306,822.
Patented June 17, 1919.
2 SHEETS—SHEET 1.
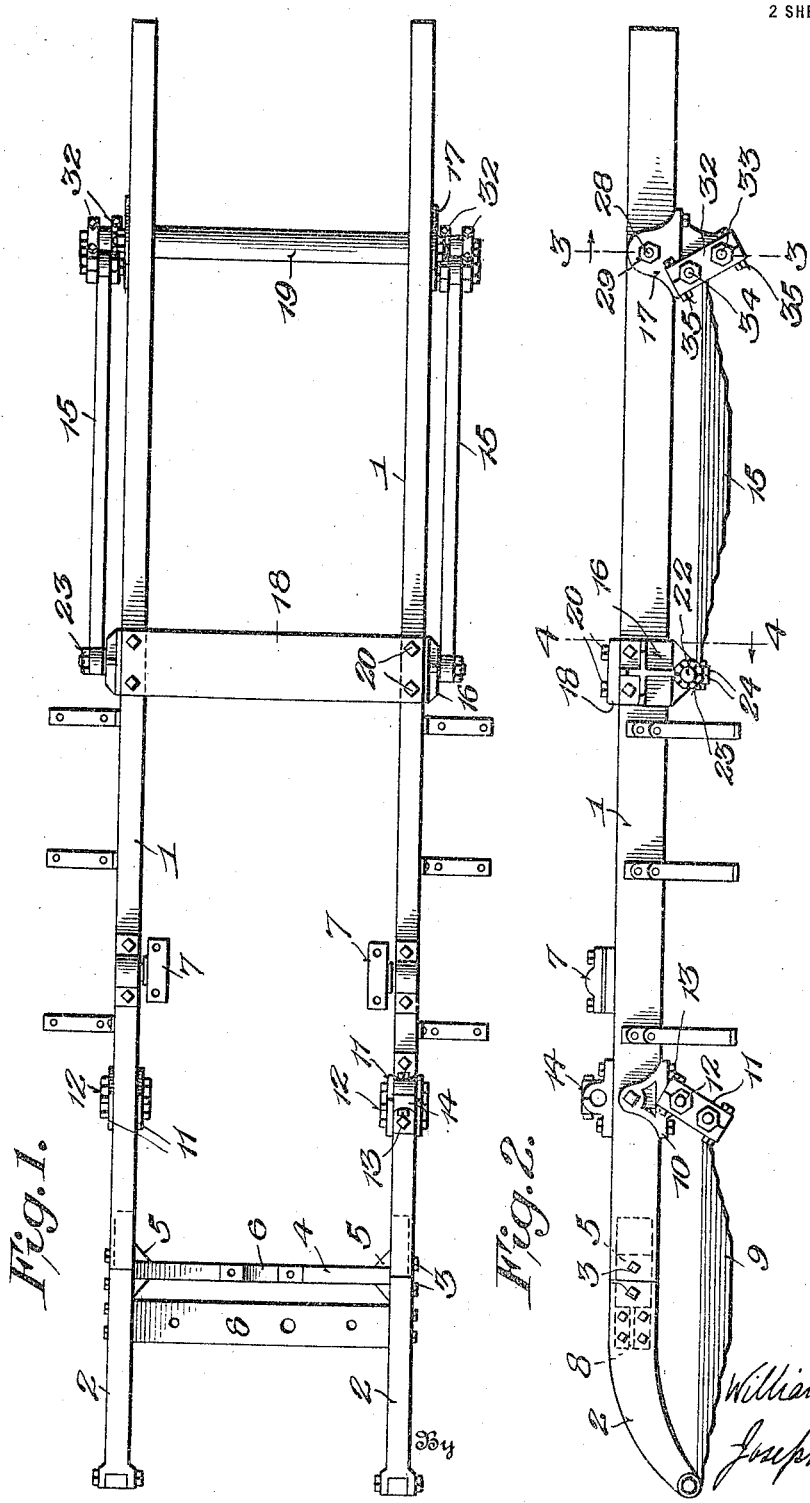
Inventor
William Krafve
By Joseph A. Miller
Attorney

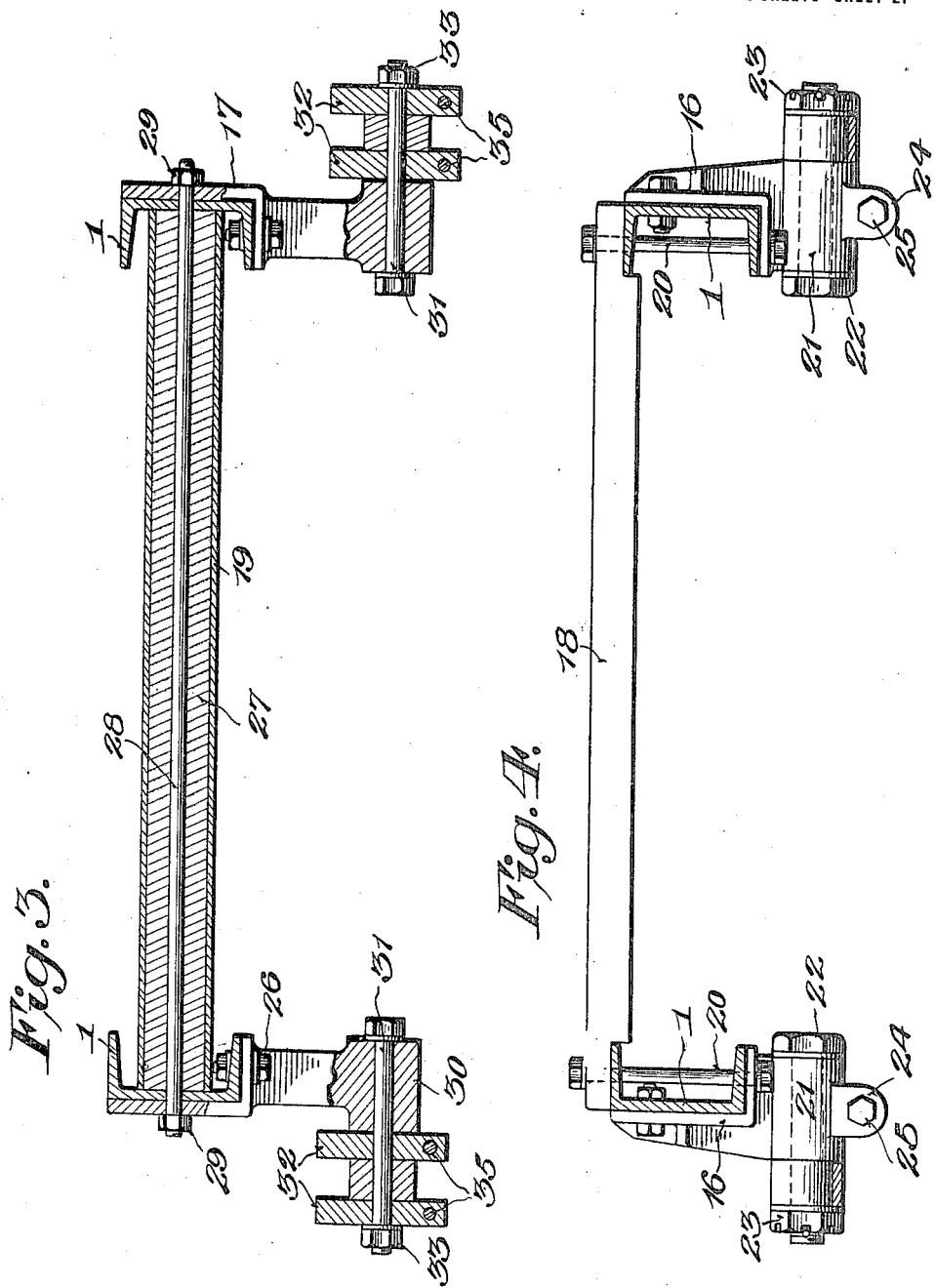

UNITED STATES PATENT OFFICE.

WILLIAM KRAFVE, OF FALL RIVER, MASSACHUSETTS, ASSIGNOR TO CAPITOL MOTORS CORPORATION, OF FALL RIVER, MASSACHUSETTS, A CORPORATION OF MASSACHUSETTS.

CHASSIS CONSTRUCTION.

1,306,822.  Specification of Letters Patent.  Patented June 17, 1919.

Application filed June 6, 1918. Serial No. 238,421.

*To all whom it may concern:*

Be it known that I, WILLIAM KRAFVE, a citizen of the United States, residing at Fall River, in the county of Bristol and State of Massachusetts, have invented a new and useful Improvement in Chassis Construction, of which the following is a specification.

This invention relates to certain new and useful improvements in a chassis construction, and it has for its principal object to eliminate all rivet fastenings and employ only bolt fasteners by which the several parts may readily be assembled and removed in an expeditious manner.

The invention further resides in the salient features of construction, and the arrangements and combinations of parts hereinafter described and claimed, reference being made to the accompanying drawings wherein—

Figure 1 is a plan view of the chassis embodying the present invention.

Fig. 2 is a side elevation thereof, and

Figs. 3 and 4 are transverse sections on lines 3—3 and 4—4 respectively, of Fig. 2, depicting the mounting of the rear springs.

Describing the invention more in detail, a chassis frame is provided comprising the two longitudinal side frame members 1 that are channeled or U-shaped in section and have the goose-necks or downwardly curved terminal sections or bracket extensions 2 secured thereto by the bolts 3 and the front cross bar 4. This cross bar has T-shaped ends 5 fitting in the channels of the side frame members so as to extend across the abutting edges of the latter and the bracket extensions and receives the bolts 3. Thus, the ends 5 of the cross bar serve as connecting plates between the frame members and their forward extensions. This cross bar is formed with a central bearing 6 for coöperating with two other bearings 7, on the frame members, to provide a three point support for a motor.

A flexible radiator support 8 is supported transversely of the chassis frame by the bracket extensions 2, and pivoted to the extreme forward ends of the latter are the front springs 9 that have their rear ends swingingly connected to brackets 10 by the shackle blocks 11. The brackets 10 engage the outer and bottom faces of the respective frame members and are provided with a bearing through which a bolt 12 passes for pivoting the shackle blocks thereto. Bolts 13 pass upwardly through the brackets, the frame members and on one side the steering rod bearing 14 for securing the parts firmly in position.

The rear springs 15 are supported at their ends by brackets 16 and 17 which are formed with right angular seats to embrace the outer and bottom faces of the frame members, as depicted in Figs. 3 and 4. A spacing bar 18 connects the side frame members at the points of mounting of the brackets 16, while a second spacing bar 19 connects the frame members at the points of mounting of the brackets 17, the former spacing bar seating on and being secured to the upper flanges of said frame members by bolts 20 which also secure the brackets 16 thereto.

Each bracket 16 has a depending and horizontally disposed split bearing 21 in which is arranged a bolt 22 that projects outwardly beyond the bearing and constitutes a stub shaft. The forward end of the respective rear spring is engaged about this stub shaft and is held against lateral dislodgment by a nut 23 threaded on said shaft. Depending on opposite sides of the split of the bearing 21 are a pair ears 24 through which is passed a clamping bolt 25 for tightening the split bearing on the bolt 22 and thereby securely and firmly gripping the same.

The rear brackets 17 are secured to the bottom flanges of the side frame members by short bolts 26 and also by the spacing bar 19 which latter comprises a tubular casing provided with a wood filler reinforcement 27 and a bolt or rod 28 which passes axially through the wood filler and is extended at each end through the side wall of the frame member and the upright wall of the bracket 17, nuts 29 being threaded on the projecting ends of the bolt 28.

A bearing 30, depending from each bracket 17, has a shaft bolt 31 passed outwardly therethrough to provide a stub-shaft support for a shackle block 32 which is retained thereon by a nut 33 threaded on said bolt. At a point spaced from its pivotal mounting, the shackle block 32 is connected to the rear end of the respective spring 15 by bolt 34.

The front and rear shackle blocks are here shown as consisting of a pair of side plates held spaced apart by sustaining spacing sleeves or washers the plates having split bearings to receive the mounting stub-shafts and bolts, said split bearings being subsequently tightened by the clamping bolts 35.

In the foregoing construction of the chassis it will be noted that rivets are entirely eliminated and in lieu thereof the several bolts are substituted whereby the frame may readily be knocked down or assembled. Consequently, if a part becomes broken it may easily be replaced without the use of special machinery.

Having thus described my invention, what I claim as new and desire to secure by Letters Patent is—

1. A chassis construction including spaced side frame members of U-section, downwardly curved forward terminal sections, a transversely arranged motor-supporting cross bar having end flanges seating in the channel of the frame members and bolted to the latter and to the respective terminal sections for connecting the same together, front springs secured at their forward ends to the terminal sections, brackets bolted to the frame members, shackle blocks swingingly supporting the rear ends of the springs from the brackets, spaced pairs of brackets bolted to the rear portions of the frame members and each having a depending bearing, a shaft bolt extending through and outwardly from each bearing, rear springs connected at their forward ends to the shaft bolts of one pair of brackets, shackle blocks connecting the opposite ends of the rear springs to the shaft bolts of the second pair of brackets, and spacing bars connecting the side frame members at points adjacent the mountings of the pairs of brackets.

2. A chassis construction including spaced side frame members of U-sections, downwardly-curved forward terminal sections, a transversely arranged motor-supporting cross bar having vertically disposed end flanges seating in the channel of the frame members and bolted to the latter and to the respective terminal sections for connecting the same together, front springs secured at their forward ends to the terminal sections, brackets bolted to the frame member, and shackle blocks swingingly supporting the rear ends of the springs from the brackets.

3. In a chassis construction, channeled side frame members, a pair of bars connecting the same at spaced points, brackets secured at each end of the spacing bars to the frame members, stub-shafts extending outwardly from each bracket, and springs connected at their opposite ends to the stub-shafts.

4. In a chassis construction, spaced side frame members, spaced pairs of brackets bolted to the rear portions of the frame members and each having a depending bearing, a shaft bolt extending through and outwardly from each bearing, rear springs connected at their forward ends to the shaft bolts of one pair of brackets, shackle blocks connecting the opposite ends of the rear springs to the shaft bolts of the second pair of brackets, and spacing bars connecting the side frame members at points adjacent the mountings of the pairs of brackets.

5. A chassis construction including side frame members, downwardly curved forward terminal sections abutting the forward edges of said frame members and a transverse bar having enlarged ends with the latter extending across the joints formed between the frame members and the terminal sections and bolted to each of the frame members and the sections.

6. A chassis construction including side frame members, downwardly curved forward terminal sections abutting the forward edges of said frame members and a transverse bar having substantially T-shaped ends with the latter extending across the joints formed between the frame members and the terminal sections and bolted to each.

7. A chassis construction including a spring supporting bracket having a right angular seat for a side frame member, and a depending split bearing, and a shaft bolt clamped in the bearing and extending therefrom to provide a support for the spring.

8. A chassis construction including side frame members, a cross bar engaged at its ends with the side members, brackets abutting the side members at points adjacent the bar ends, and bolts passing through the bar ends, through the side members and through the brackets to secure all of said parts together.

9. A chassis construction including side frame members, a cross bar engaged at its ends with the side members, brackets abutting the side members at points adjacent the bar ends, and a horizontal bolt passed longitudinally through the cross bar and through each of the brackets.

10. A chassis construction including side frame members, a cross bar engaged at its ends with the side members, brackets abutting the side members at points adjacent the bar ends, and vertical bolts passed through the ends of the cross bar, through the side members and through the brackets to secure all of the parts together.

11. In a chassis construction, side frame members, a cross bar engaged at its ends with said members, brackets having vertical parts abutting the outer side faces of the members and having right angular lower parts abutting the bottoms of the members, and bolts passed through one of the said parts of the brackets, through the bar and through the members.

12. In a chassis construction, side frame members, spring supporting brackets having right-angular seats for said members, a spring support carried by the base of each of the brackets and extending transversely below and beneath the frame members in vertical alinement with the latter, and springs connected at their ends to said supports.

In testimony whereof I have signed my name to this specification in the presence of two subscribing witnesses.

WILLIAM KRAFVE.

Witnesses:
ADA E. HAGERTY,
J. A. MILLER.

Copies of this patent may be obtained for five cents each, by addressing the "Commissioner of Patents, Washington, D. C."